United States Patent
Hasegawa

(10) Patent No.: US 12,043,250 B2
(45) Date of Patent: Jul. 23, 2024

(54) COLLISION AVOIDANCE APPARATUS

(71) Applicant: TOYOTA JIDOSHA KABUSHIKI KAISHA, Toyota (JP)

(72) Inventor: Takashi Hasegawa, Kanagawa-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 483 days.

(21) Appl. No.: 17/457,452

(22) Filed: Dec. 3, 2021

(65) Prior Publication Data
US 2022/0176948 A1   Jun. 9, 2022

(30) Foreign Application Priority Data
Dec. 7, 2020   (JP) .................. 2020-202814

(51) Int. Cl.
*B60W 30/09*   (2012.01)
*B60W 10/18*   (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0956; B60W 30/12;
(Continued)

(56) References Cited

U.S. PATENT DOCUMENTS

2018/0151073 A1* 5/2018 Minemura ............ G08G 1/166
2018/0346026 A1   12/2018 Fujii

FOREIGN PATENT DOCUMENTS

| JP | 2010-079424 A | 4/2010 |
|----|---------------|--------|
| JP | 2018-144675 A | 9/2018 |
| JP | 2018-203097 A | 12/2018 |

OTHER PUBLICATIONS

Sun, Qinyu, et al. "Human-Like Obstacle Avoidance Trajectory Planning and Tracking Model for Autonomous Vehicles That Considers the Driver's Operation Characteristics." Sensors 20.17 (2020): 4821. (Year: 2020).*

* cited by examiner

*Primary Examiner* — Russell Frejd
*Assistant Examiner* — Ana D Thomas
(74) *Attorney, Agent, or Firm* — Sughrue Mion, PLLC

(57) ABSTRACT

A collision avoidance apparatus includes an object information acquisition device for acquiring object information including a three-dimensional object and dividing lines, a steering input value acquisition device for acquiring a steering input value based on a driver's steering operation, and control unit for executing collision avoidance control when a collision condition is satisfied based on the object information. When the steering input value of a steering operation to the right is defined to be positive, the control unit is configured to perform one of: avoiding executing the collision avoidance control even when the collision condition is satisfied; and changing a threshold value used for the collision condition so that satisfaction of this condition becomes more difficult, in a case where a right side adjacent lane is present, this lane is a lane in the same direction, and the steering input value is a predetermined positive steering threshold value or more.

14 Claims, 7 Drawing Sheets

(51) Int. Cl.
*B60W 10/20* (2006.01)
*B60W 30/095* (2012.01)
*B60W 30/12* (2020.01)
*B60W 40/072* (2012.01)
*B60W 50/00* (2006.01)
*B60W 60/00* (2020.01)
*G06V 20/56* (2022.01)
*G06V 20/58* (2022.01)

(52) U.S. Cl.
CPC ........ *B60W 30/0956* (2013.01); *B60W 30/12* (2013.01); *B60W 40/072* (2013.01); *B60W 50/0097* (2013.01); *B60W 60/0011* (2020.02); *B60W 60/0015* (2020.02); *G06V 20/58* (2022.01); *G06V 20/588* (2022.01); *B60W 2050/0054* (2013.01); *B60W 2552/30* (2020.02); *B60W 2552/53* (2020.02); *B60W 2710/207* (2013.01)

(58) Field of Classification Search
CPC .......... B60W 40/072; B60W 50/0097; B60W 60/0011; B60W 60/0015; B60W 2050/0054; B60W 2552/30; B60W 2552/53; B60W 2710/207; B60W 2540/18; B60W 30/095; B60W 30/0953; B60W 30/18163; B60W 40/00; B60W 40/02; B60W 2520/06; B60W 2420/403; G06V 20/58; G06V 20/588; G06V 20/647
See application file for complete search history.

COLLISION AVOIDANCE APPARATUS

BACKGROUND OF THE INVENTION

1. Field of the Invention

The present invention relates to a collision avoidance apparatus configured to execute collision avoidance control of, for example, avoiding a collision with a three-dimensional object or mitigating an impact due to a collision.

2. Description of the Related Art

Hitherto, there has been known a collision avoidance apparatus configured to perform, when a three-dimensional object having a possibility of colliding with a vehicle is detected in front of the vehicle, control (collision avoidance control) of, for example, avoiding a collision with the three-dimensional object or mitigating an impact due to a collision (for example, refer to Japanese Patent Application Laid-open No. 2010-079424). The collision avoidance apparatus calculates a trajectory of the vehicle and a trajectory of the three-dimensional object, and determines based on those trajectories whether or not there is a possibility of the vehicle colliding with the three-dimensional object.

Collision avoidance control is control of executing at least one of autonomous emergency braking control in which a braking force is autonomously applied to the vehicle or autonomous steering control in which a steered angle of steered wheels of the vehicle is autonomously changed. In order to distinguish a vehicle in which the collision avoidance apparatus is mounted from other vehicles, a vehicle in which the collision avoidance apparatus is mounted is hereinafter referred to as "own vehicle".

With the collision avoidance apparatus of Japanese Patent Application Laid-open No. 2010-079424 (hereinafter referred to as "related-art apparatus"), there is a possibility of non-required collision avoidance control being executed when a driver of the own vehicle operates a steering wheel to the right while driving.

For example, in a case in which the driver performs a lane change from a current lane (lane in which the own vehicle is currently positioned) to a right side adjacent lane (lane adjacent to the current lane on a right side), the driver first operates the steering wheel to the right (clockwise), and when the own vehicle starts to enter the right side adjacent lane, the driver operates the steering wheel to the left (counterclockwise), thereby performing the lane change. Here, "operating the steering wheel to the right (or to the left)" means that the steered wheels of the own vehicle are steered to the right (or to the left) by the operation.

There are cases in which the own vehicle turns right during travel such that the own vehicle crosses an oncoming lane at a position other than an intersection (for example, when the own vehicle enters a parking lot of a facility positioned on the right side of the oncoming lane). In such a case, when another vehicle traveling on the oncoming lane approaches, the related-art apparatus determines whether or not there is a possibility of the own vehicle colliding with the another vehicle based on the trajectory of the own vehicle and the trajectory of the another vehicle, and when it is determined that there is such a possibility, collision avoidance control is executed.

When the driver operates the steering wheel to the right to perform a lane change, the trajectory of the own vehicle temporarily matches a trajectory exhibited when the own vehicle turns right. Therefore, when another vehicle traveling on the oncoming lane approaches while the driver is operating the steering wheel to the right, the related-art apparatus may determine that there is a possibility of the own vehicle colliding with the another vehicle based on the trajectory of the own vehicle and the trajectory of the another vehicle. In this case, the collision avoidance control is executed even though the driver then operates the steering wheel to the left and hence the possibility of colliding with the another vehicle is actually extremely low. Accordingly, such collision avoidance control is a non-required operation.

Note that, the example described above is an example which applies to left-hand traffic countries (countries using a lane layout in which the oncoming lane is positioned on the right side of the traveling lane). In right-hand traffic countries (countries using a lane layout in which the oncoming lane is positioned on the left side of the traveling lane), the example described above may be described by reading left and right in reverse.

SUMMARY OF THE INVENTION

The present invention has been made to address the problems described above. That is, one object of the present invention is to provide a collision avoidance apparatus configured to reduce a possibility of non-required collision avoidance control being executed when a driver of an own vehicle operates a steering wheel to the right while driving.

A first collision avoidance apparatus (hereinafter referred to as "first invention apparatus) according to at least one embodiment of the present invention includes: an object information acquisition device (20) configured to acquire, as object information, information on a three-dimensional object present in front of an own vehicle and dividing lines defining a lane extending in front of the own vehicle; a steering input value acquisition device (21) configured to acquire a steering input value ($\theta s$) being an input value based on a steering operation, which is an operation of a steering wheel by a driver of the own vehicle; and a control unit (10) configured to calculate each of a trajectory of the own vehicle and a trajectory of the three-dimensional object based on at least the object information, and to execute, as collision avoidance control, at least one of autonomous emergency braking control of autonomously applying a braking force to the own vehicle or autonomous steering control of autonomously changing a steered angle of steered wheels of the own vehicle when a collision condition is satisfied, the collision condition being satisfied when it is determined based on the trajectory of the own vehicle and the trajectory of the three-dimensional object that a possibility of the own vehicle colliding with the three-dimensional object exists. When the steering input value ($\theta s$) of a steering operation to right by the driver is defined as a positive value and the steering input value ($\theta s$) of a steering operation to left by the driver is defined as a negative value, the control unit (10) is configured to perform one of: avoiding executing the collision avoidance control even when the collision condition is satisfied (Step 450: Yes); and changing a threshold value (TTC threshold value) to be used for the collision condition so that satisfaction of the collision condition becomes more difficult, in a first case in which a right side adjacent lane being a lane adjacent to right of a current lane in which the own vehicle is currently positioned is present (Step 420: Yes), a same-direction condition satisfied when a travel direction of another vehicle traveling on the right side adjacent lane is the same as a travel direction of the own vehicle is satisfied (Step 430: Yes), and the steering input value (θs) is equal to or more than a predetermined steering threshold value (θsth) having a positive value (Step 440: Yes).

The first case is a case in which, for example, the own vehicle has started changing lanes from the current lane to the right side adjacent lane, or an own vehicle temporarily parked at the left edge of the current lane has started merging into the right side adjacent lane. In those cases, the driver is performing a steering operation to the right, but the possibility of the own vehicle entering the oncoming lane is extremely low. In the first case, the first invention apparatus is configured to perform one of: avoiding executing the collision avoidance control even when the collision condition is satisfied; and changing the threshold value to be used for the collision condition so that satisfaction of the collision condition becomes more difficult. Therefore, with the configuration of the first invention apparatus, it is possible to reduce the possibility of non-required collision avoidance control being executed when the driver performs a steering operation to the right while driving. Further, depending on the width of a roadside zone, there is a case in which, when the own vehicle is temporarily parked, the left edge of the own vehicle protrudes from the current lane and is positioned in the roadside zone (for example, when the roadside zone exceeds 0.75 m). For convenience of description, the own vehicle is herein regarded as being positioned in the current lane even in such a case.

According to at least one aspect of the present invention, the object information acquisition device (20) is further configured to acquire information on a three-dimensional object present in rear of the own vehicle as the object information, and the control unit (10) is configured to execute, when it is determined based on the object information that the collision condition is satisfied for another vehicle present in the right side adjacent lane in the first case (Step 450: Yes), emergency lane keeping control (Step 460) of autonomously changing the steered angle of the steered wheels of the own vehicle so that the own vehicle is prevented from departing from the current lane to the right side adjacent lane.

According to the at least one aspect of the present invention, it is possible to safely change lanes or merge into the right side adjacent lane.

According to the at least one aspect of the present invention, the control unit (10) is configured to, when a curvature (Cc) of a center line obtained when the center line curves to the right is defined as a positive value, and when a curvature of the center line obtained when the center line curves to the left is defined as a negative value: calculate a curvature (Cc) of the center line being a dividing line between the current lane and the right side adjacent lane in a second case in which the right side adjacent lane is present (Step 420: Yes), the same-direction condition is not satisfied (Step 430: No), and the steering input value (θs) is equal to or more than the steering threshold value (θsth) (Step 600: Yes); and calculate (Step 620), when a curvature condition which is satisfied when the curvature of the center line is equal to or more than a predetermined curvature threshold value having a positive value is satisfied (Step 610: Yes), a trajectory of another vehicle traveling on the right side adjacent lane in front of the own vehicle based on the curvature (Cc) of the center line.

Note that, "the center line curves to the right or left" means that the center line curves to the right or left with respect to the current travel direction of the own vehicle.

In the second case, the same-direction condition is not satisfied, and therefore the right side adjacent lane is an oncoming lane. As a result, "when the curvature condition is satisfied in the second case" means, for example, that the own vehicle is traveling on a current lane which curves to the right while the driver is performing a steering operation to the right. In this case, the driver is performing a steering operation to the right, but the possibility of the own vehicle entering the oncoming lane is extremely low. The first invention apparatus is configured to calculate, "when the curvature condition is satisfied in the second case," the trajectory of the another vehicle traveling on the right side adjacent lane in front of the own vehicle (that is, the oncoming vehicle approaching the own vehicle) based on the curvature of the center line. Consequently, it is possible to improve accuracy of determination of the collision condition compared with a configuration in which the determination of whether or not the collision condition is satisfied is performed based on the "trajectory of the own vehicle" and the "trajectory of another vehicle calculated without considering the curvature of the center line." Therefore, with this configuration, it is possible to reduce the possibility of non-required collision avoidance control being executed when the driver performs a steering operation to the right while driving.

According to the at least one aspect of the present invention, the control unit (10) is configured to: calculate the curvature (Cc) of the center line being a dividing line between the current lane and the right side adjacent lane in a second case in which the right side adjacent lane is present (Step 420: Yes), the same-direction condition is not satisfied (Step 430: No), and the steering input value (θs) is equal to or more than the steering threshold value (θsth) (Step 600: Yes); and calculate a trajectory of another vehicle traveling on the right side adjacent lane in front of the own vehicle based on the curvature (Cc) of the center line.

The second case is, for example, a case in which the own vehicle is traveling on a current lane which curves to the right while the driver is performing a steering operation to the right, or a case in which the own vehicle is about to turn right from a current lane which is a straight line or curves to the left. The first invention apparatus is configured to calculate, in the second case, the trajectory of another vehicle (an oncoming vehicle approaching the own vehicle) based on the curvature of the center line. Consequently, it is possible to improve the accuracy of determination of the collision condition compared with a configuration in which the determination of whether or not the collision condition is satisfied is performed based on the "trajectory of the own vehicle" and the "trajectory of another vehicle calculated without considering the curvature of the center line." Therefore, with this configuration, it is possible to reduce the possibility of non-required collision avoidance control being executed when the driver performs a steering operation to the right while driving.

According to the at least one aspect of the present invention, the control unit (10) is configured to calculate the trajectory of the another vehicle so that a curvature of the trajectory of the another vehicle matches the curvature (Cc) of the center line.

A second collision avoidance apparatus (hereinafter referred to as "second invention apparatus) according to at least one embodiment of the present invention includes: an object information acquisition device configured to acquire, as object information, information on a three-dimensional object present in front of an own vehicle and dividing lines defining a lane extending in front of the own vehicle; a steering input value acquisition device configured to acquire a steering input value being an input value based on a steering operation, which is an operation of a steering wheel by a driver of the own vehicle; and a control unit configured to calculate each of a trajectory of the own vehicle and a trajectory of the three-dimensional object based on at least the object information, and to execute, as collision avoidance control, at least one of autonomous emergency braking control of autonomously applying a braking force to the own vehicle or autonomous steering control of autonomously changing a steered angle of steered wheels of the own vehicle when a collision condition is satisfied, the collision condition being satisfied when it is determined based on the trajectory of the own vehicle and the trajectory of the three-dimensional object that a possibility of the own vehicle colliding with the three-dimensional object exists. When the steering input value of a steering operation to left by the driver is defined as a positive value and the steering input value of a steering operation to right by the driver is defined as a negative value, the control unit is configured to perform one of: avoiding executing the collision avoidance control even when the collision condition is satisfied; and changing a threshold value to be used for the collision condition so that satisfaction of the collision condition becomes more difficult, in a third case in which a left side adjacent lane being a lane adjacent to left of a current lane in which the own vehicle is currently positioned is present, a same-direction condition satisfied when a travel direction of another vehicle traveling on the left side adjacent lane is the same as the travel direction of the own vehicle is satisfied, and the steering input value is equal to or more than a predetermined steering threshold value having a positive value.

According to the at least one aspect of the present invention, the object information acquisition device is further configured to acquire information on a three-dimensional object present in rear of the own vehicle as the object information, and the control unit is configured to execute, when it is determined based on the object information that the collision condition is satisfied for another vehicle present in the left side adjacent lane in the third case, emergency lane keeping control of autonomously changing the steered angle of the steered wheels of the own vehicle so that the own vehicle is prevented from departing from the current lane to the left side adjacent lane.

According to the at least one aspect of the present invention, the control unit is configured to, when a curvature of a center line obtained when the center line curves to the left is defined as a positive value, and when a curvature of the center line obtained when the center line curves to the right is defined as a negative value: calculate a curvature of the center line being a dividing line between the current lane and the left side adjacent lane in a fourth case in which the left side adjacent lane is present, the same-direction condition is not satisfied, and the steering input value is equal to or more than the steering threshold value; and calculate, when a curvature condition which is satisfied when the curvature of the center line is equal to or more than a predetermined curvature threshold value having a positive value is satisfied, a trajectory of another vehicle traveling on the left side adjacent lane in front of the own vehicle based on the curvature of the center line.

According to the at least one aspect of the present invention, the control unit is configured to: calculate the curvature of the center line being a dividing line between the current lane and the left side adjacent lane in a fourth case in which the left side adjacent lane is present, the same-direction condition is not satisfied, and the steering input value is equal to or more than the steering threshold value; and calculate a trajectory of another vehicle traveling on the left side adjacent lane in front of the own vehicle based on the curvature of the center line.

According to the at least one aspect of the present invention, the control unit is configured to calculate the trajectory of the another vehicle so that a curvature of the trajectory of the another vehicle matches the curvature of the center line.

In order to facilitate the understanding of the invention, in the above description, the constituent features of the invention corresponding to at least one embodiment of the present invention are suffixed in parentheses with reference symbols used in the at least one embodiment. However, the constituent features of the invention are not intended to be limited to the at least one embodiment as defined by the reference symbols.

Figure 1:
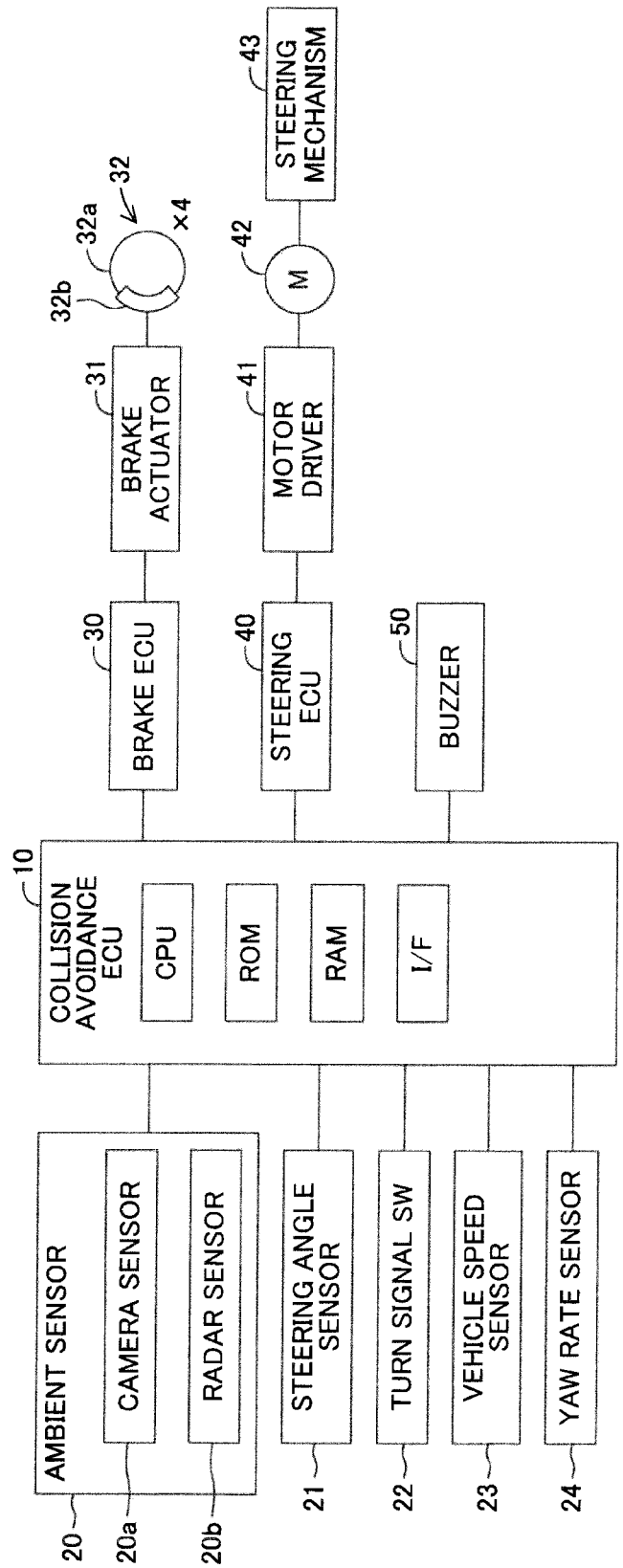
FIG. 1 is a schematic configuration diagram of a collision avoidance apparatus according to at least one embodiment of the present invention.

DESCRIPTION OF THE EMBODIMENTS (Configuration)
There is now described a collision avoidance apparatus (hereinafter also referred to as "present embodiment apparatus") according to at least one embodiment of the present invention with reference to the drawings. As illustrated in FIG. 1, the present embodiment apparatus includes a collision avoidance ECU 10, a brake ECU 30, and a steering ECU 40. The ECUs 10, 30 and 40 each include a microcomputer as a main component, and are connected to each other in a manner in which the ECUs 10, 30 and 40 can transmit and receive data to and from each other via a controller area network (CAN) (not shown). The term "ECU" is an abbreviation for "electronic control unit." The microcomputer includes a central processing unit (CPU), a read-only memory (ROM), a random-access memory (RAM), and an interface, for example, and the CPU is configured to implement various functions by executing instructions (programs, or routines) stored in the ROM. A part or all of the ECUs 10, 30 and 40 may be integrated as a controller into one ECU. A vehicle having the present embodiment apparatus mounted therein is hereinafter referred to as "own vehicle."

The present embodiment apparatus is configured on the assumption that the present embodiment apparatus is to be mounted in an own vehicle used in a left-hand traffic country. The present embodiment apparatus can be mounted in an own vehicle to be used in a right-hand traffic country through change of the specifications so that the terms "left" and "right" in the following description are switched. In this case, "first case" and "second case" herein are read as "third case" and "fourth case," respectively.

The collision avoidance ECU 10 is connected to an ambient sensor 20, a steering angle sensor 21, a turn signal switch (turn signal SW) 22, a vehicle speed sensor 23, and a yaw rate sensor 24. The collision avoidance ECU 10 is configured to acquire signals from the sensors and switch each time a predetermined cycle elapses. The collision avoidance ECU 10 is hereinafter also simply referred to as "ECU 10."

The ambient sensor 20 (object information acquisition device) includes a camera sensor 20a and radar sensors 20b.

The camera sensor 20a is installed on a back surface of an inner mirror (room mirror, or rear view mirror) of the own vehicle. The camera sensor 20a has a function of acquiring information on "three-dimensional objects present in front of the own vehicle and dividing lines extending in front of the own vehicle." The term "three-dimensional object" includes moving objects (for example, vehicles, pedestrians, and bicycles) and stationary objects (for example, guardrails, side walls, median strips, and roadside trees). The term "moving object" means an object which can move, and does not mean that the object is always moving.

The camera sensor 20a includes a monocular camera. The camera sensor 20a is configured to photograph the landscape in front of the own vehicle and to recognize dividing lines based on photographed image data. A dividing line is a line marked on a road to separate the passage of vehicles by direction. The term "dividing line" includes solid dividing lines and dashed dividing lines. The solid dividing line is a dividing line which is continuously marked on the road, and includes a white dividing line and a yellow dividing line. The dashed dividing line is a dividing line which is intermittently marked on the road at predetermined intervals, and includes a white dividing line. In the present embodiment apparatus, the area between two adjacent dividing lines extending along the roadway is defined as a "lane". A center line is the dividing line between "the lane in which the vehicles traveling in one direction are positioned" and "the lane in which the vehicles traveling in the other direction are positioned." The travel direction of the vehicles can be separated by the center line.

The camera sensor 20a calculates a shape of the lane (including a curvature C of the dividing lines) based on the recognized dividing lines. In addition, the camera sensor 20a calculates the presence or absence of a three-dimensional object and a relative relationship between the own vehicle and the three-dimensional object based on the above-mentioned image data. The relative relationship between the own vehicle and the three-dimensional object includes, for example, a distance from the own vehicle to the three-dimensional object, the orientation of the three-dimensional object with respect to the own vehicle, and a relative speed of the three-dimensional object with respect to the own vehicle. In the at least one embodiment, the curvature C of the dividing lines at the time when the dividing lines are curved to the right is defined as a positive value, and the curvature C of the dividing lines at the time when the dividing lines are curved to the left is defined as a negative value.

That is, the camera sensor 20a can detect a three-dimensional object present in front of the own vehicle and the dividing lines present in front of the own vehicle. The "dividing lines extending in front of the own vehicle" also includes the left and right dividing lines defining each of the adjacent lanes on the left and right sides (lanes adjacent to the current lane on the left and right sides, respectively).

The radar sensors 20b are installed at left and right corners of a rear bumper of the own vehicle. The radar sensors 20b have a function of acquiring information on "three-dimensional objects present in rear (including rear lateral sides) of the own vehicle."

The radar sensors 20b are configured to radiate radio waves in the millimeter wave band in rear of the own vehicle, and to receive the reflected wave from a three-dimensional object when the three-dimensional object is present. The radar sensors 20b calculate the presence or absence of a three-dimensional object and the relative relationship between the own vehicle and the three-dimensional object based on the radiation timing and reception timing of the radio wave.

The information acquired by the ambient sensor 20 is referred to as "object information." The ambient sensor 20 is configured to output the object information to the ECU 10.

The camera sensor 20a may include a stereo camera. In addition, information on the shape of the lane may be acquired through use of a navigation system (not shown).

The steering angle sensor 21 (steering input value acquisition device) is configured to detect a steering angle θs (steering input value) of a steering wheel of the own vehicle, and to output a detection signal of the steering angle θs to the ECU 10. In the at least one embodiment, the steering angle θs at the time when the steering wheel is operated to the right is defined as a positive value, and the steering angle θs at the time when the steering wheel is operated to the left is defined as a negative value.

The turn signal SW 22 is arranged on a turn signal lever (not shown). The turn signal lever is an operating device to be operated by a driver of the own vehicle in order to activate a turn signal (not shown) (cause the turn signal to flash on and off), and is arranged on a steering column (a component of a steering mechanism 43 described later). The turn signal lever is configured to be movable from a neutral position about a support shaft to a left stroke position and a right stroke position, which are positions rotated to the left and to the right by a predetermined stroke angle, respectively. When the turn signal lever is moved to the left stroke position or the right stroke position by an operation by the driver, the turn signal lever is held at the left stroke position or the right stroke position by a locking mechanism even when the operating force is released. When the steering wheel is rotated to the right or to the left while the turn signal lever is held at the left stroke position or the right stroke position, or when the driver operates the turn signal lever to the right or to the left, the lock by the locking mechanism is released, and the turn signal lever is returned to the neutral position.

The turn signal SW 22 includes a left turn signal SW and a right turn signal SW. The left turn signal SW is configured to generate an ON signal only when the turn signal lever is at the left stroke position, and to generate an OFF signal when the turn signal lever is not at the left stroke position. The right turn signal SW is configured to generate an ON signal only when the turn signal lever is at the right stroke position, and to generate an OFF signal when the turn signal lever is not at the right stroke position. The ECU 10 acquires the signals generated by the left and right turn signals SW, and when a signal is an ON signal, the ECU 10 causes the turn signal corresponding to the left or right turn signal SW to flash on and off.

The vehicle speed sensor 23 is configured to generate a signal corresponding to a traveling speed (vehicle speed) of the own vehicle. The ECU 10 acquires the signal generated by the vehicle speed sensor 23 and calculates the vehicle speed based on the signal.

The yaw rate sensor 24 is configured to generate a signal corresponding to a yaw rate acting on the own vehicle. The ECU 10 acquires the signal generated by the yaw rate sensor 24 and calculates the yaw rate based on the signal.

The brake ECU 30 is connected to a brake actuator 31. The brake actuator 31 is arranged in a hydraulic circuit arranged between a master cylinder (not shown) configured to pressurize hydraulic fluid by a pedaling force of a brake pedal and a friction brake mechanism 32 arranged on each wheel. The friction brake mechanism 32 includes a brake disc 32a fixed to the wheel and a brake caliper 32b fixed to a vehicle body. The friction brake mechanism 32 is configured to press a brake pad against the brake disc 32a to generate a friction braking force by causing a wheel cylinder built in the brake caliper 32b to be activated by the hydraulic pressure of the hydraulic fluid supplied from the brake actuator 31. The brake ECU 30 is hereinafter also simply referred to as "ECU 30."

The ECU 10 can transmit a braking command (described later) to the ECU 30. When the braking command is received, the ECU 30 drives (controls) the brake actuator 31 in accordance with the command. As a result, the ECU 10 can autonomously apply a braking force to the own vehicle via the ECU 30.

The steering ECU 40 is a well-known control device for an electric power steering system, and is connected to a motor driver 41. The motor driver 41 is connected to a steering motor 42. The steering motor 42 is incorporated in a steering mechanism 43 (for example, a rack-and-pinion mechanism). The steering motor 42 can generate torque by using electric power supplied from the motor driver 41, apply that torque to the steering mechanism 43 to generate a steering assist torque, and steer the left and right steered wheels. The steering ECU 40 is hereinafter also simply referred to as "ECU 40."

The ECU 10 can transmit a steering command (described later) to the ECU 40. When the steering command is received, the ECU 40 drives (controls) the steering motor 42 in accordance with the command. As a result, the ECU 10 can autonomously change the steered angle of the steered wheels via the ECU 40.

A buzzer 50 is built in a meter panel (not shown). The ECU 10 can cause the buzzer 50 to produce a sound.

Next, the ECU 10 is described. The present embodiment apparatus can execute the following three types of control, that is, autonomous emergency braking control, emergency lane keeping control, and lane departure prevention control. The present embodiment apparatus executes the autonomous emergency braking control as collision avoidance control.

(Autonomous Emergency Braking Control)

The autonomous emergency braking control is control of autonomously applying a braking force to the own vehicle when a collision condition is satisfied. The collision condition is a condition satisfied when there is a possibility of the own vehicle colliding with a three-dimensional object (strictly speaking, a three-dimensional object present in front of the own vehicle). Whether or not the collision condition is satisfied is determined by the ECU 10.

Specifically, the ECU 10 calculates each of a trajectory of the own vehicle and a trajectory of the three-dimensional object. The trajectory of the own vehicle can be calculated based on a turning radius of the own vehicle, which is calculated based on the vehicle speed obtained from the vehicle speed sensor 23 and the yaw rate obtained from the yaw rate sensor 24. The trajectory of the three-dimensional object can be calculated based on a trend of the "position (orientation and distance) of the three-dimensional object included in the object information." The trajectory of a three-dimensional object is typically a speed vector. Based on those trajectories, the ECU 10 determines whether or not the own vehicle is to collide with the three-dimensional object when the own vehicle travels while maintaining a current traveling state and the three-dimensional object moves while maintaining a current moving state. When the three-dimensional object is a stationary object, the ECU 10 determines whether or not the own vehicle is to collide with the three-dimensional object based on the trajectory of the own vehicle and the current position of the three-dimensional object.

When it is determined that the own vehicle is to collide with the three-dimensional object, the ECU 10 calculates a predicted collision time (TTC: time to collision), which is the time until the own vehicle is predicted to collide with the three-dimensional object. The TTC can be calculated by dividing the distance from the own vehicle to the "point determined to be the collision point with the three-dimensional object" by the relative speed of the own vehicle with respect to the three-dimensional object. When the TTC is equal to or less than a predetermined TTC threshold value, the ECU 10 determines that there is a possibility of the own vehicle colliding with the three-dimensional object, that is, the collision condition is satisfied.

When the collision condition is satisfied, the ECU 10 transmits a braking command to the ECU 30. More specifically, the ECU 10 calculates a target deceleration required in order to stop the own vehicle at a position before the three-dimensional object satisfying the collision condition by a predetermined distance, and transmits a braking command being a command including the target deceleration to the ECU 30. The deceleration is a negative acceleration.

When the ECU 30 receives the braking command, the ECU 30 controls the brake actuator 31 to generate a frictional braking force on each wheel so that the actual acceleration matches the target deceleration, and decelerates the own vehicle. The above description is an outline of the autonomous emergency braking control. The autonomous emergency braking control is executed by the ECU 30 which has received the braking command from the ECU 10, and therefore, for convenience of description, the autonomous emergency braking control may hereinafter also be referred to as "the ECU 10 executes the autonomous emergency braking control."

(Emergency Lane Keeping Control)

The emergency lane keeping control is control of autonomously changing the steered angle of the steered wheels of the own vehicle when the collision condition is satisfied for a three-dimensional object (typically, another vehicle) present in the left side adjacent lane or the right side adjacent lane so that the own vehicle does not depart from the current lane to an "adjacent lane on the side on which the three-dimensional object satisfying the collision condition is present."

Specifically, the ECU 10 determines whether or not an left side adjacent lane or an right side adjacent lane is present by using the object information, and when an left side adjacent lane or an right side adjacent lane is present, the ECU 10 determines whether or not a three-dimensional object is present in the left side adjacent lane or the right side adjacent lane. When a three-dimensional object is present, the ECU 10 determines whether or not the collision condition is satisfied for the three-dimensional object.

When the collision condition is satisfied for the three-dimensional object present in the left side adjacent lane or the right side adjacent lane, the ECU 10 transmits a steering command to the ECU 40. More specifically, the ECU 10 sets a target position at a predetermined position in the current lane, and calculates a smooth target trajectory passing through the front end center position and the target position of the own vehicle by a well-known method (for example, refer to Japanese Patent Application Laid-open No. 2018-144675). After that, the ECU 10 calculates a target steered angle required for the own vehicle to travel along the target trajectory, and transmits a steering command being a command including the target steered angle to the ECU 40.

When the steering command is received, the ECU 40 controls the steering motor 42 in accordance with the target steered angle to steer the steered wheels. As a result, the steered angle of the steered wheels is autonomously changed (that is, steering torque is applied to the steering mechanism 23), and the own vehicle travels such that the own vehicle avoids a collision with the three-dimensional object without departing from the current lane. The above description is an outline of the emergency lane keeping control. The emergency lane keeping control is executed by the ECU 40 which has received the steering command from the ECU 10, and therefore, for convenience of description, the emergency lane keeping control may hereinafter also be referred to as "the ECU 10 executes the emergency lane keeping control."

(Lane Departure Prevention Control)

The lane departure prevention control is control of warning the driver when there is a possibility of the own vehicle departing from the current lane under a state in which the turn signal is not flashing on an off.

Specifically, the ECU 10 determines whether or not there is a possibility of the own vehicle departing from the current lane based on the steering angle θs acquired from the steering angle sensor 21 and a curvature Co of the dividing lines of the current lane included in the object information. For example, when the steering angle θs is equal to or more than a predetermined steering angle threshold value θsth (steering threshold value) having a positive value (θs≥θsth) and the curvature Co is less than a predetermined curvature threshold value Cth having a positive value (Co<Cth), the ECU 10 determines that there is a possibility of the own vehicle departing from the current lane. A case in which "θs≥θsth" is satisfied is a case in which the driver is performing a steering operation to the right at a steering angle θs equal to or more than the steering angle threshold value θsth. A case in which "Co<Cth" is satisfied is a case in which the current lane is a straight line or curves to the left. When there is a possibility of the own vehicle departing from the current lane, the ECU 10 determines whether or not the turn signal (strictly speaking, the turn signal corresponding to the departure direction) is flashing on and off based on the signal generated by the turn signal SW 22.

When the turn signal is not flashing on and off, the ECU 10 sounds the buzzer 50 to warn the driver. The above description is an outline of the lane departure prevention control. Note that, the steering angle threshold value θsth changes depending on the vehicle speed. That is, a map defining a relationship between the vehicle speed and the steering angle θs is stored in advance in the ROM of the ECU 10, and the ECU 10 sets the steering angle θs corresponding to the current vehicle speed to the steering angle threshold value θsth by referring to the map. The map is generated so that the steering angle θs decreases as the vehicle speed increases.

(Operation Outline)

The ECU 10 determines whether or not to execute each of the autonomous emergency braking control, the emergency lane keeping control, and the lane departure prevention control based on the information acquired from the sensors and switch (refer to FIG. 1). In the following, an outline of criteria for determining whether or not to execute each control is described.

[Autonomous Emergency Braking Control]

(Condition 1)

(1) There is an intersection in front of the own vehicle.
(2) The right turn signal is flashing on and off.
(3) The collision condition is satisfied for an oncoming vehicle or another three-dimensional object.

A case in which all of the conditions 1(1) to 1(3) are satisfied is "a case in which there is a possibility of the own vehicle colliding with an oncoming vehicle or another three-dimensional object (for example, a pedestrian passing through an intersection) when the own vehicle turns right at the intersection." In this case, the ECU 10 executes the autonomous emergency braking control.

(Condition 2)

(1) There is no intersection in front of the own vehicle.
(2) The right side adjacent lane is an oncoming lane.
(3) The driver is performing a steering operation to the right at a steering angle θs (θsth).
(4) The current lane (and the right side adjacent lane) curves to the right.
(5) The collision condition is satisfied for an oncoming vehicle or another three-dimensional object.

A case in which all of the conditions 2(1) to 2(5) are satisfied is "a case in which there is a possibility of the own vehicle colliding with an oncoming vehicle or another three-dimensional object when the own vehicle is traveling on a current lane curving to the right while the driver is performing a steering operation to the right." In this case, the ECU 10 executes the autonomous emergency braking control. The "another three-dimensional object" is, for example, a pedestrian traveling on a sidewalk positioned on the right side of an oncoming vehicle.

However, in the condition 2(5), when determining whether or not the collision condition is satisfied for an oncoming vehicle, the ECU 10 changes the method of calculating the trajectory of the oncoming vehicle. That is, in place of calculating the trajectory of the oncoming vehicle based on the trend of the position of the oncoming vehicle, the ECU 10 calculates the trajectory of the oncoming vehicle so that the curvature of the trajectory of the oncoming vehicle matches a curvature Cc of the center line. This method of calculating the trajectory may be applied to other three-dimensional objects. Further, "a case in which all of the conditions 2(1) to 2(3) are satisfied" corresponds to an example of "the second case."

Figure 2:
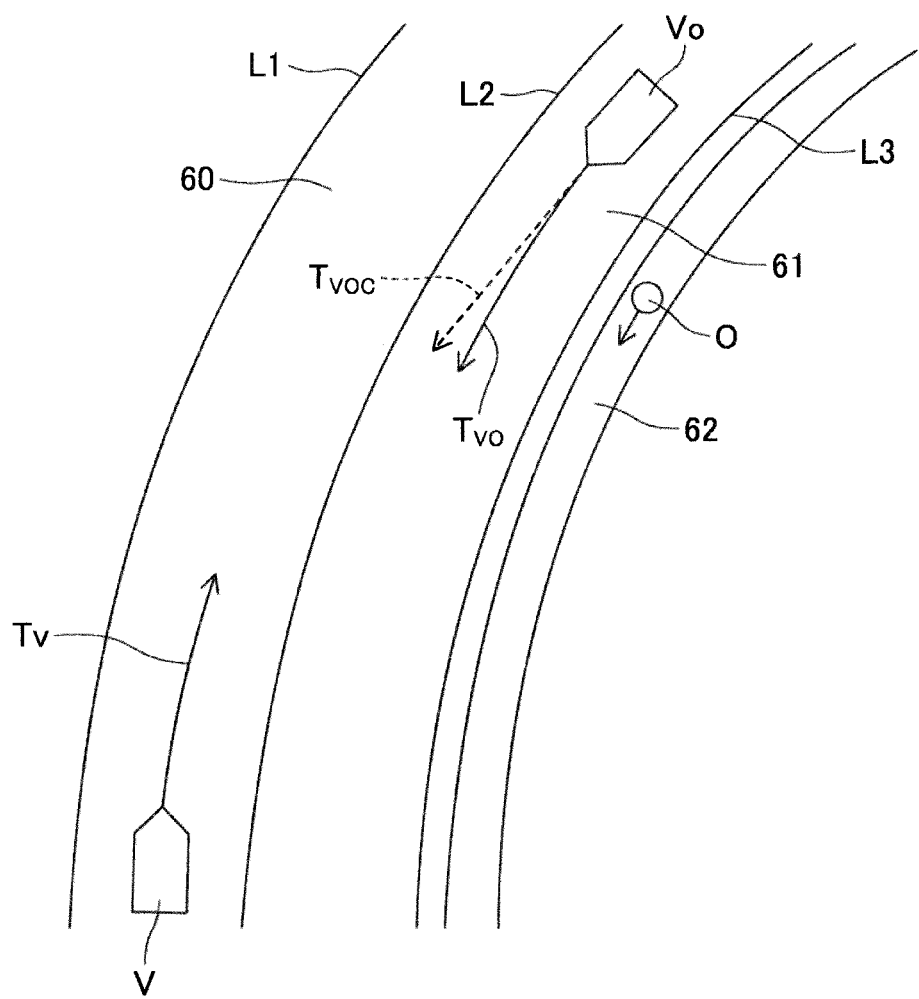
FIG. 2 is a diagram for illustrating a condition 2.

This is now specifically described with reference to FIG. 2. As illustrated in FIG. 2, a lane 60 is defined by two adjacent dividing lines L1 and L2. An own vehicle V is traveling on the lane 60. That is, the lane 60 is the current lane. A lane 61 is defined by two adjacent dividing lines L2 and L3. The lane 61 is an right side adjacent lane of the current lane 60. An oncoming vehicle Vo is traveling on the lane 61. That is, the lane 61 is an oncoming lane, and the dividing line L2 is the center line. A sidewalk 62 is positioned on the right side of the oncoming lane 61. A pedestrian O is traveling on the sidewalk 62 in the direction approaching the own vehicle V. The current lane 60, the oncoming lane 61, and the sidewalk 62 are curved to the right (in other words, the curvature Cc of the center line L2 is equal to or more than the curvature threshold value Cth). The driver of the own vehicle V is steering the own vehicle V to the right in order to drive the own vehicle V on the current lane 60. That is, in FIG. 2, the conditions 2(1) to 2(4) are satisfied. The driver of the oncoming vehicle Vo is steering the oncoming vehicle Vo to the left when viewed from the driver of the oncoming vehicle Vo in order to drive the oncoming vehicle Vo on the oncoming lane 61.

When the own vehicle V is steered to the right, a trajectory Tv of the own vehicle V curves to the right. In contrast, when the trajectory of the oncoming vehicle Vo is calculated based on the trend of the position of the oncoming vehicle Vo, the trajectory is a straight line extending toward the current lane 60, as shown by an arrow Tvoc. Therefore, the collision condition is easily satisfied for the oncoming vehicle Vo, and despite the fact that the possibility of the own vehicle V actually colliding with the oncoming vehicle Vo is extremely low, non-required autonomous emergency braking control is executed.

Therefore, the ECU 10 is configured to calculate the trajectory of the oncoming vehicle Vo so that the curvature of the trajectory of the oncoming vehicle Vo matches the curvature Cc of the center line L2 when determining whether or not the collision condition is satisfied for the oncoming vehicle Vo. An arrow Tvo indicates the trajectory calculated in this way. This improves accuracy of calculation of the trajectory Tvo of the oncoming vehicle Vo, and as a result, the accuracy of determination of whether or not the collision condition is satisfied for the oncoming vehicle Vo (the accuracy of determination of the condition 2(5)) is improved. With this configuration, it is possible to reduce the possibility that non-required autonomous emergency braking control is executed when the driver of the own vehicle V is performing a steering operation to the right while driving.

The method of calculating the trajectory of the pedestrian O is not particularly limited. For example, the ECU 10 may calculate the trajectory of the pedestrian O so that the curvature of the trajectory of the pedestrian O matches the curvature Cc of the center line L2.

The trajectory of the oncoming vehicle may be calculated as follows. That is, the own vehicle and a preceding vehicle each include a communication device capable of communicating to and from a server, a GPS receiver, and map information. The preceding vehicle can transmit information on the trend of the position of the oncoming vehicle over a relatively long period of time to the server. The server includes the map information, and can hold the received information together with a reception time thereof. The own vehicle accesses the server and acquires the information. The ECU 10 calculates the trajectory of the oncoming vehicle based on the acquired information. With this configuration as well, the accuracy of calculation of the trajectory of the oncoming vehicle can be improved.

(Condition 3)
(1) There is no intersection in front of the own vehicle.
(2) The right side adjacent lane is an oncoming lane.
(3) The driver is performing a steering operation to the right at a steering angle θs (θsth).
(4) The current lane (and the right side adjacent lane) is a straight line or curves to the left.
(5) The right turn signal is flashing on and off.
(6) The collision condition is satisfied for an oncoming vehicle or another three-dimensional object.

A case in which all of the conditions 3(1) to 3(6) are satisfied is "a case in which there is a possibility of the own vehicle colliding with an oncoming vehicle or another three-dimensional object (for example, a pedestrian traveling on a sidewalk positioned on the right side of the oncoming vehicle) when the own vehicle turns right from a current lane which is a straight line or curves to the left." In this case, the ECU 10 executes the autonomous emergency braking control. Further, "a case in which all of the conditions 3(1) to 3(3) are satisfied" corresponds to an example of "the second case."

[Emergency Lane Keeping Control]
(Condition 4)
(1) There is no intersection in front of the own vehicle.
(2) The right side adjacent lane is a lane in the same direction (a lane in which another vehicle travels in the same travel direction as the travel direction of the own vehicle).
(3) The driver is performing a steering operation to the right at the steering angle θs (θsth).
(4) The collision condition is satisfied for another vehicle present in the right side adjacent lane.

A case in which all of the conditions 4(1) to 4(4) are satisfied is "a case in which the own vehicle has started to change lanes or merge into the right side adjacent lane, and the possibility of collision with another vehicle present in the right side adjacent lane has arisen." In this case, the ECU 10 executes the emergency lane keeping control. In other words, the ECU 10 does not execute the autonomous emergency braking control even when a collision condition (including not only a collision condition to be satisfied for another vehicle present in the right side adjacent lane but also a collision condition to be satisfied for an oncoming vehicle or another three-dimensional object) is satisfied. Further, "a case in which all of the conditions 4(1) to 4(3) are satisfied" corresponds to an example of "the first case."

Figure 3:
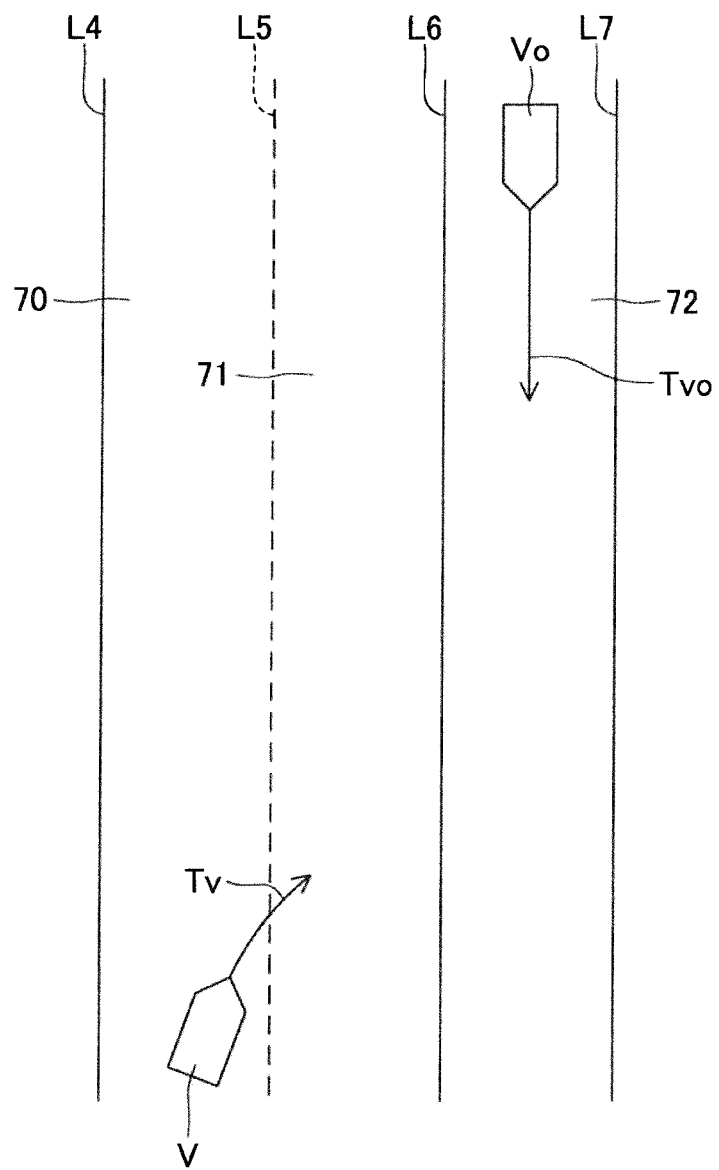
FIG. 3 is a diagram for illustrating a condition 4.

This is now specifically described with reference to FIG. 3. As illustrated in FIG. 3, a lane 70 is defined by two adjacent dividing lines L4 and L5. An own vehicle V is traveling on the lane 70. That is, the lane 70 is the current lane. A lane 71 is defined by two adjacent dividing lines L5 and L6. The lane 71 is an right side adjacent lane of the current lane 70 while also being a lane in the same direction. The lane 72 is defined by two adjacent dividing lines L6 and L7. The oncoming vehicle Vo is traveling on the lane 72. That is, the lane 72 is an oncoming lane, and the dividing line L6 is the center line. The current lane 70, the lane 71 adjacent on the right side, and the oncoming lane 72 extend in a straight line. The driver of the own vehicle V has started to change lanes from the current lane 70 to the lane 71 adjacent on the right side. That is, in FIG. 3, conditions 4(1) to 4(3) are satisfied. The oncoming vehicle Vo is traveling straight on the oncoming lane 72.

When the driver of the own vehicle V performs a steering operation to the right due to a lane change, the trajectory Tv of the own vehicle V curves to the right (that is, toward oncoming lane 72) and temporarily matches the trajectory at the time when the own vehicle V turns right. Therefore, during the period in which the driver is performing a steering operation to the right, the collision condition is easily satisfied for the oncoming vehicle Vo, and despite the fact that the possibility of the own vehicle V actually colliding with the oncoming vehicle Vo is extremely low, non-required autonomous emergency braking control is executed.

Therefore, the ECU 10 is configured to avoid executing the autonomous emergency braking control even when the collision condition is satisfied when the conditions 4(1) to 4(3) are satisfied. As a result, it is possible to reduce the possibility of non-required autonomous emergency braking control being executed when the driver of the own vehicle V performs a steering operation to the right while driving.

However, when the own vehicle V changes lanes or merges into the right side adjacent lane, there is a possibility of colliding with another vehicle depending on the relative relationship with the another vehicle present in the right side adjacent lane. Therefore, the ECU 10 is configured to execute the emergency lane keeping control in place of the autonomous emergency braking control when the conditions 4(1) to 4(3) are satisfied and the collision condition is satisfied for the "another vehicle present in the right side adjacent lane." As a result, it is possible to safely change lanes or merge into the right side adjacent lane.

When the collision condition is satisfied in a case in which the conditions 4(1) to 4(3) are satisfied, the ECU 10 may be configured to, instead of avoiding executing the autonomous emergency braking control, reduce the TTC threshold value (strictly speaking, the TTC threshold value to be used for the collision condition of the autonomous emergency braking control) to a predetermined value. As a result, it becomes difficult for the collision condition to be satisfied, and therefore the possibility of executing non-required autonomous emergency braking control can be reduced even with this configuration.

In this case, it is not required to execute the emergency lane keeping control. Further, the emergency lane keeping control and the autonomous emergency braking control may be coordinated (however, the TTC threshold value to be used for the collision condition of the emergency lane keeping control is not reduced) by performing the emergency lane keeping control in "a case in which the conditions 4(1) to 4(4) are satisfied" and performing the autonomous emergency braking control in "a case in which condition 4(4) is not satisfied, but a collision condition is satisfied for an oncoming vehicle or another three-dimensional object."
(Condition 5)
(1) There is no intersection in front of the own vehicle.
(2) The right side adjacent lane is an oncoming lane.
(3) The driver is performing a steering operation to the right at a steering angle θs (θsth).
(4) The current lane (and the right side adjacent lane) is a straight line or curves to the left.
(5) The right turn signal is not flashing on and off.

A case in which all of the conditions 5(1) to 5(5) are satisfied is "a case in which there is a possibility of the own vehicle departing from the current lane which is a straight line or curves to the left to the oncoming lane side." In this case, the ECU 10 executes the lane departure prevention control.

The above description is an outline of the operations.
(Specific Operation)

Next, specific operations of the CPU of the ECU 10 are described. During a period in which "even a part of the dividing lines of the current lane are detected in front of the own vehicle," the CPU executes a routine illustrated in the flowcharts of FIG. 4 to FIG. 7 each time a predetermined duration elapses.

Figure 4:
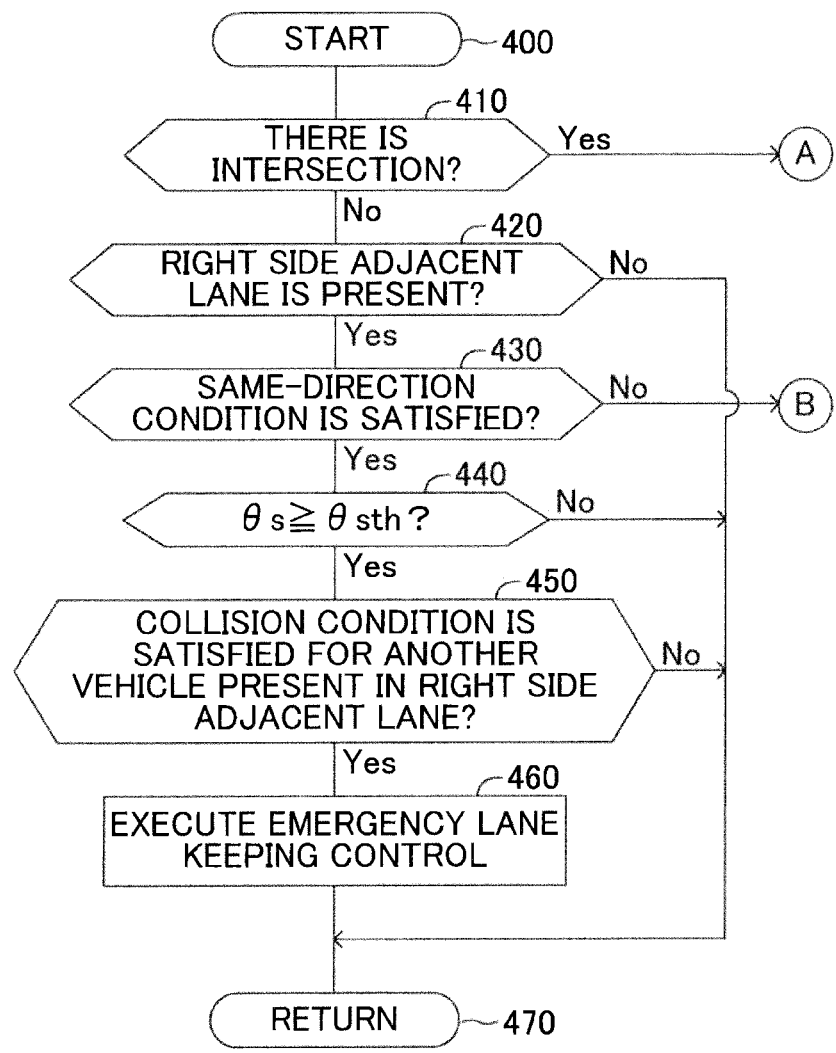
FIG. 4 is a flowchart (Part 1) for illustrating a routine to be executed by a CPU of a collision avoidance ECU of the collision avoidance apparatus.
Figure 5:
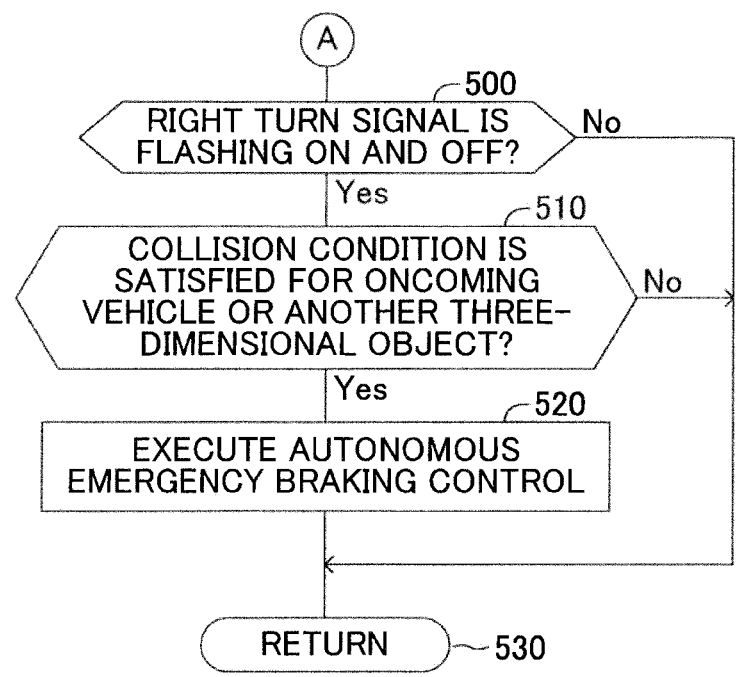
FIG. 5 is a flowchart (Part 2) for illustrating a routine to be executed by the CPU.
Figure 6:
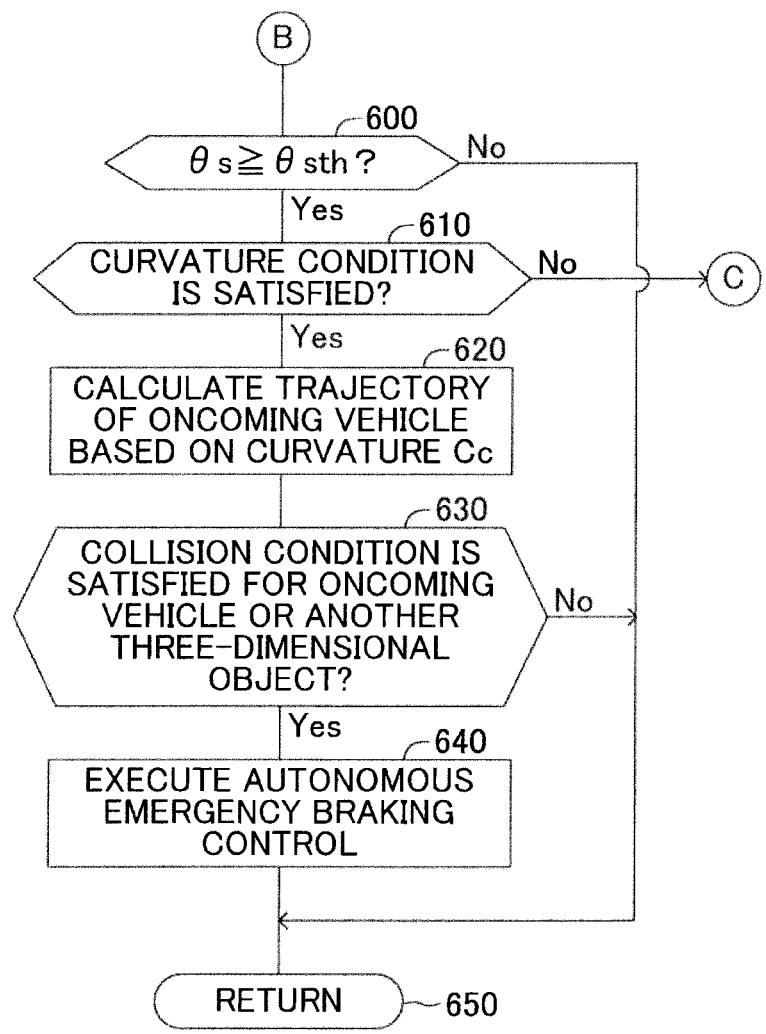
FIG. 6 is a flowchart (Part 3) for illustrating a routine to be executed by the CPU.

At a predetermined timing, the CPU starts the processing from Step 400 of FIG. 4, advances to Step 410, and determines whether or not there is an intersection in front of the own vehicle based on the object information. Whether or not there is an intersection in front of the own vehicle can be determined by determining whether or not the dividing lines of the current lane are continuously detected up to a point ahead of the own vehicle by a predetermined distance. The "predetermined distance" is the travel distance obtained when it is assumed that the own vehicle travels at the current vehicle speed for a predetermined period of time. Even in a case in which the detected dividing lines are not continuous, when the distance between the non-continuous dividing lines is less than a predetermined distance threshold value, the CPU determines that "the dividing lines are continuously detected" by interpolating (inserting) the non-continuous portions. When the dividing lines of the current lane are not continuously detected up to the above-mentioned point, the CPU determines "Yes" in Step 410 (determines that there is an intersection in front of the own vehicle), and advances to Step 500 of FIG. 5.

In Step 500, the CPU determines whether or not the right turn signal is flashing on and off. When the right turn signal is off, the CPU determines "No" in Step 500, advances to Step 530, and temporarily ends the routine. That is, the own vehicle proceeds straight ahead at the intersection. Meanwhile, when the right turn signal is flashing on and off, the CPU determines "Yes" in Step 500 (determines that the driver has an intention to turn right), and advances to Step 510.

In Step 510, the CPU determines whether or not the collision condition is satisfied for an oncoming vehicle or another three-dimensional object. When the collision condition is not satisfied, the CPU determines "No" in Step 510, advances to Step 530, and temporarily ends the routine. That is, the own vehicle turns right at the intersection. Meanwhile, when the collision condition is satisfied (that is, when all of the conditions 1(1) to 1(3) are satisfied), the CPU determines "Yes" in Step 510, and advances to Step 520.

In Step 520, the CPU executes the autonomous emergency braking control in response to the oncoming vehicle or another three-dimensional object satisfying the collision condition. Then, the CPU advances to Step 530 and temporarily ends the routine.

Meanwhile, in Step 410 of FIG. 4, when the dividing lines of the current lane are continuously detected up to the point ahead of the own vehicle by a predetermined distance, the CPU determines "No" in Step 410 (determines that there is no intersection in front of the own vehicle), and advances to Step 420.

In Step 420, the CPU determines whether or not an right side adjacent lane is present based on the object information. Whether or not an right side adjacent lane is present can be determined by determining whether or not a dividing line is detected to the right of the right-side dividing line of the current lane. When a dividing line is not detected, the CPU determines "No" in Step 420 (determines that an right side adjacent lane is not present), advances to Step 470, and temporarily ends the routine. Meanwhile, when a dividing line is detected, the CPU determines "Yes" in Step 420 (determines that an right side adjacent lane is present), and advances to Step 430.

In Step 430, the CPU determines whether or not a same-direction condition is satisfied based on the object information. The same-direction condition is a condition which is satisfied when the travel direction of another vehicle traveling on the right side adjacent lane is the same as the travel direction of the own vehicle (that is, the lane is a lane in the same direction). Whether or not the same-direction condition is satisfied can be determined based on the angle θ (0 degrees≤θ≤360 degrees) formed by a speed vector of the own vehicle and a speed vector of the another vehicle traveling on the right side adjacent lane. Those speed vectors can both be calculated based on the object information. When the angle θ is within a predetermined oncoming direction range (for example, 150 degrees≤θ≤210 degrees), the CPU determines "No" in Step 430 (determines that the right side adjacent lane is an oncoming lane), and advances to Step 600 of FIG. 6.

When it is not possible to determine whether or not the same-direction condition is satisfied because another vehicle is not traveling on the right side adjacent lane, the CPU is configured to determine "Yes" in Step 430 (determines that the right side adjacent lane is a lane in the same direction).

Whether or not the same-direction condition is satisfied may be determined by any of the following methods. In a first method, the server is configured to record information on a travel history of the vehicle in a memory. The communication device included in the own vehicle accesses the server and acquires the information on the travel history of the another vehicle traveling on the right side adjacent lane. The CPU determines whether or not the same-direction condition is satisfied based on the acquired information. In a second method, the own vehicle includes a communication device capable of road-to-vehicle communication to and from an external communication device arranged on the side of the roadway. The external communication device is configured to record information on the travel history of the another vehicle traveling on the right side adjacent lane in a memory. The communication device of the own vehicle accesses the external communication device to acquire the information. The CPU determines whether or not the same-direction condition is satisfied based on the acquired information.

In Step 600, the CPU determines whether or not the current steering angle θs is equal to or more than the steering angle threshold value θsth (that is, whether or not the driver is performing a steering operation to the right at the steering angle θs (≥θsth)). When "θs<θsth" is satisfied, the CPU determines "No" in Step 600, advances to Step 650, and temporarily ends the routine. That is, the own vehicle continues to travel on the current lane, changes lanes to the left side adjacent lane, or turns left from the current lane. Meanwhile, when "θs≥θsth" is satisfied, the CPU determines "Yes" in Step 600, and advances to Step 610.

In Step 610, the CPU determines whether or not the curvature condition is satisfied based on the object information. The curvature condition is a condition which is satisfied when the curvature Cc of the center line is equal to or more than the curvature threshold value Cth. When the curvature condition is satisfied (Cc≥Cth), the CPU determines "Yes" in Step 610 (determines that the current lane (and oncoming lane) curves to the right), and advances to Step 620.

In Step 620, the CPU calculates the trajectory of the oncoming vehicle so that the curvature of the trajectory of the oncoming vehicle matches the curvature Cc of the center line. Then, the CPU advances to Step 630 and determines whether or not the collision condition is satisfied for an oncoming vehicle or another three-dimensional object. When the collision condition is not satisfied, the CPU determines "No" in Step 630, advances to Step 650, and temporarily ends the routine. That is, the own vehicle continues to travel on the current lane which curves to the right. Meanwhile, when the collision condition is satisfied (that is, when all of the conditions 2(1) to 2(5) are satisfied), the CPU determines "Yes" in Step 630, and advances to Step 640.

In Step 640, the CPU executes the autonomous emergency braking control in response to the oncoming vehicle or another three-dimensional object satisfying the collision condition. With this configuration, the trajectory of the oncoming vehicle is calculated in Step 620 based on the curvature Cc of the center line, and therefore the accuracy of determination of the collision condition in Step 630 is improved. Therefore, the possibility of non-required autonomous emergency braking control being executed when it is clear that the own vehicle is not making a right turn which crosses the oncoming lane can be reduced. The CPU then advances to Step 650 and temporarily ends the routine.

Figure 7:
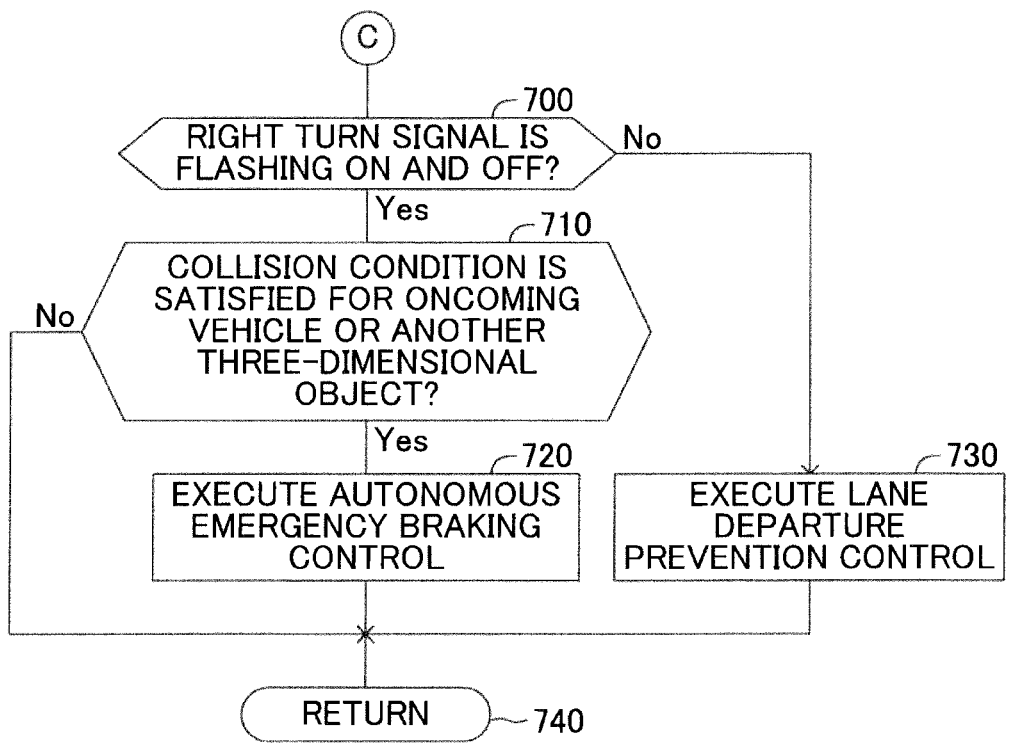
FIG. 7 is a flowchart (Part 4) for illustrating a routine to be executed by the CPU.

Meanwhile, in Step 610, when the curvature condition is not satisfied (Cc<Cth), the CPU determines "No" in Step 610 (determines that the current lane (and oncoming lane) is a straight line or curves to the left), and advances to Step 700 of FIG. 7.

In Step 700, the CPU determines whether or not the right turn signal is flashing on and off. When the right turn signal is flashing on and off, the CPU determines "Yes" in Step 700 (determines that the driver has an intention to turn right), and advances to Step 710.

In Step 710, the CPU determines whether or not the collision condition is satisfied for an oncoming vehicle or another three-dimensional object. When the collision condition is not satisfied, the CPU determines "No" in Step 710, advances to Step 740, and temporarily ends the routine. That is, the own vehicle turns right from the current lane which is a straight line or curves to the left. Meanwhile, when the collision condition is satisfied (that is, when all of the conditions 3(1) to 3(6) are satisfied), the CPU determines "Yes" in Step 710, and advances to Step 720.

In Step 720, the CPU executes the autonomous emergency braking control in response to the oncoming vehicle or another three-dimensional object satisfying the collision condition. Then, the CPU advances to Step 740 and temporarily ends the routine.

Meanwhile, when the right turn signal is off in Step 700 (that is, when all of the conditions 5(1) to 5(5) are satisfied), the CPU determines "No" in Step 700 (determines that there is a possibility of the own vehicle departing from the current lane to the oncoming lane side), and advances to Step 730. In Step 730, the CPU executes the lane departure prevention control. Then, the CPU advances to Step 740 and temporarily ends the routine.

Meanwhile, in Step 430 of FIG. 4, when the angle θ is equal to or less than a predetermined same-direction range (for example, 0 degrees≤θ≤30 degrees, 330 degrees≤θ≤360 degrees), the CPU determines "Yes" in Step 430 (determines that the right side adjacent lane is a lane in the same direction), and advances to Step 440.

In Step 440, the CPU determines whether or not "θs≥θsth" is satisfied. When "θs<θsth" is satisfied, the CPU determines "No" in Step 440, advances to Step 470, and temporarily ends the routine. That is, the own vehicle continues to travel on the current lane, changes lanes to the left side adjacent lane, or turns left from the current lane. Meanwhile, when "θs≥θsth" is satisfied, the CPU determines "Yes" in Step 440 (that is, determines that the own vehicle is changing lanes or merging from the current lane into the right side adjacent lane), and advances to Step 450.

In Step 450, the CPU determines whether or not the collision condition is satisfied for the another vehicle present in the right side adjacent lane based on the object information. When the collision condition is not satisfied, the CPU determines "No" in Step 450, advances to Step 470, and temporarily ends the routine. That is, the own vehicle changes lanes or merges from the current lane into the right side adjacent lane. Meanwhile, when the collision condition is satisfied (that is, when all of the conditions 4(1) to 4(3) are satisfied), the CPU determines "Yes" in Step 450 and advances to Step 460.

In Step 460, the CPU executes the emergency lane keeping control. With this configuration, the autonomous emergency braking control is not executed even when the collision condition is satisfied for an oncoming vehicle or another three-dimensional object, and therefore the possibility of non-required autonomous emergency braking control being executed when it is clear that the own vehicle is not making a right turn which crosses the oncoming lane can be reduced. In addition, through execution of the emergency lane keeping control, the own vehicle can safely change lanes or merge into the right side adjacent lane. The CPU then advances to Step 470 and temporarily ends the routine.

MODIFICATION EXAMPLE

Next, a collision avoidance apparatus (hereinafter also referred to as "modification apparatus") according to a modification example of the present invention is described. In the following description, like parts to those in the at least one embodiment are denoted by like reference numerals, and a detailed description thereof is omitted.

In the modification apparatus, the configuration of the condition 2 is different from that of the present embodiment apparatus. Specifically, the ECU 10 of the modification apparatus is configured to determine, when the conditions 2(1) to 2(3) are satisfied, whether or not the condition 2(5) is satisfied regardless of whether or not the condition 2(4) is satisfied. That is, the ECU 10 of the modification apparatus determines whether or not the collision condition is satisfied for an oncoming vehicle or another three-dimensional object regardless of the shape of the current lane (and the right side adjacent lane). Regarding the condition 2(5), the fact that the method of calculating the trajectory of the oncoming vehicle is changed is the same as in the present embodiment apparatus. A case in which all of the conditions 2(1) to 2(3) and 2(5) are satisfied is "a case in which there is a possibility of the own vehicle colliding with the oncoming vehicle or another three-dimensional object when the own vehicle is traveling on the current lane while the driver is performing a steering operation to the right." In this case, the ECU 10 executes the autonomous emergency braking control.

The configuration of the modification apparatus also improves the accuracy of determination of whether or not the collision condition is satisfied for an oncoming vehicle (accuracy of determination of condition 2(5)), and therefore the same effect as that of the present embodiment apparatus can be obtained.

In the above, the collision avoidance apparatus according to the at least one embodiment and the modification example has been described, but the present invention is not limited to the above-mentioned at least one embodiment and modification example. Various changes are possible within the range not departing from the object of the present invention.

For example, as the collision avoidance control, autonomous steering control may be executed in place of or in addition to the autonomous emergency braking control. The autonomous steering control is similar to the emergency lane keeping control in that the steered angle of the steered wheels of the own vehicle is autonomously changed. However, there is a difference in that the emergency lane keeping control aims to prevent the own vehicle from departing to an adjacent lane in which "another vehicle having a possibility of colliding with the own vehicle" is present, but the autonomous steering control aims to avoid (or mitigate) a collision with a three-dimensional object having a possibility of colliding with the own vehicle.

Further, the ECU 10 may be connected to a steering torque sensor. Whether or not the driver is performing a steering operation to the right may be determined based on the steering torque acquired from the steering torque sensor.

Moreover, the lane departure prevention control may include not only control of warning the driver but also control of autonomously changing the steered angle of the steered wheels of the own vehicle so that the own vehicle does not depart from the current lane.

What is claimed is:

1. A collision avoidance apparatus, comprising:
an object information acquisition device configured to acquire, as object information, information on a three-dimensional object present in front of an own vehicle and dividing lines defining a lane extending in front of the own vehicle;
a steering input value acquisition device configured to acquire a steering input value being an input value based on a steering operation, which is an operation of a steering wheel by a driver of the own vehicle; and
a control unit configured to calculate each of a trajectory of the own vehicle and a trajectory of the three-dimensional object based on at least the object information, and to execute, as collision avoidance control, at least one of autonomous emergency braking control of autonomously applying a braking force to the own vehicle or autonomous steering control of autonomously changing a steered angle of steered wheels of the own vehicle when a collision condition is satisfied, the collision condition being satisfied when it is determined based on the trajectory of the own vehicle and the trajectory of the three-dimensional object that a possibility of the own vehicle colliding with the three-dimensional object exists, wherein the control unit is configured to, when the steering input value of a steering operation to right by the driver is defined as a positive value and the steering input value of a steering operation to left by the driver is defined as a negative value, perform one of: avoiding executing the collision avoidance control even when the collision condition is satisfied; and changing a threshold value to be used for the collision condition so that satisfaction of the collision condition becomes more difficult, in a first case in which a right side adjacent lane being a lane adjacent to right of a current lane in which the own vehicle is currently positioned is present, a same-direction condition satisfied when a travel direction of another vehicle traveling on the right side adjacent lane is the same as a travel direction of the own vehicle is satisfied, and the steering input value is equal to or more than a predetermined steering threshold value having a positive value.

2. The collision avoidance apparatus according to claim 1, wherein the object information acquisition device is further configured to acquire information on a three-dimensional object present in rear of the own vehicle as the object information, and
wherein the control unit is configured to execute, when it is determined based on the object information that the collision condition is satisfied for another vehicle present in the right side adjacent lane in the first case, emergency lane keeping control of autonomously changing the steered angle of the steered wheels of the own vehicle so that the own vehicle is prevented from departing from the current lane to the right side adjacent lane.

3. The collision avoidance apparatus according to claim 1, wherein the control unit is configured to, when a curvature of a center line obtained when the center line curves to the right is defined as a positive value, and when a curvature of the center line obtained when the center line curves to the left is defined as a negative value:

calculate a curvature of the center line being a dividing line between the current lane and the right side adjacent lane in a second case in which the right side adjacent lane is present, the same-direction condition is not satisfied, and the steering input value is equal to or more than the steering threshold value; and calculate, when a curvature condition which is satisfied when the curvature of the center line is equal to or more than a predetermined curvature threshold value having a positive value is satisfied, a trajectory of another vehicle traveling on the right side adjacent lane in front of the own vehicle based on the curvature of the center line.

4. The collision avoidance apparatus according to claim 2, wherein the control unit is configured to, when a curvature of a center line obtained when the center line curves to the right is defined as a positive value, and when a curvature of the center line obtained when the center line curves to the left is defined as a negative value:

calculate a curvature of the center line being a dividing line between the current lane and the right side adjacent lane in a second case in which the right side adjacent lane is present, the same-direction condition is not satisfied, and the steering input value is equal to or more than the steering threshold value; and calculate, when a curvature condition which is satisfied when the curvature of the center line is equal to or more than a predetermined curvature threshold value having a positive value is satisfied, a trajectory of another vehicle traveling on the right side adjacent lane in front of the own vehicle based on the curvature of the center line.

5. The collision avoidance apparatus according to claim 1, wherein the control unit is configured to:

calculate the curvature of the center line being a dividing line between the current lane and the right side adjacent lane in a second case in which the right side adjacent lane is present, the same-direction condition is not satisfied, and the steering input value is equal to or more than the steering threshold value; and calculate a trajectory of another vehicle traveling on the right side adjacent lane in front of the own vehicle based on the curvature of the center line.

6. The collision avoidance apparatus according to claim 2, wherein the control unit is configured to:

calculate the curvature of the center line being a dividing line between the current lane and the right side adjacent lane in a second case in which the right side adjacent lane is present, the same-direction condition is not satisfied, and the steering input value is equal to or more than the steering threshold value; and calculate a trajectory of another vehicle traveling on the right side adjacent lane in front of the own vehicle based on the curvature of the center line.

7. The collision avoidance apparatus according to claim 3, wherein the control unit is configured to calculate the trajectory of the another vehicle so that a curvature of the trajectory of the another vehicle matches the curvature of the center line.

8. A collision avoidance apparatus, comprising:

an object information acquisition device configured to acquire, as object information, information on a three-dimensional object present in front of an own vehicle and dividing lines defining a lane extending in front of the own vehicle;

a steering input value acquisition device configured to acquire a steering input value being an input value based on a steering operation, which is an operation of a steering wheel by a driver of the own vehicle; and a control unit configured to calculate each of a trajectory of the own vehicle and a trajectory of the three-dimensional object based on at least the object information, and to execute, as collision avoidance control, at least one of autonomous emergency braking control of autonomously applying a braking force to the own vehicle or autonomous steering control of autonomously changing a steered angle of steered wheels of the own vehicle when a collision condition is satisfied, the collision condition being satisfied when it is determined based on the trajectory of the own vehicle and the trajectory of the three-dimensional object that a possibility of the own vehicle colliding with the three-dimensional object exists, wherein the control unit is configured to, when the steering input value of a steering operation to left by the driver is defined as a positive value and the steering input value of a steering operation to right by the driver is defined as a negative value, perform one of: avoiding executing the collision avoidance control even when the collision condition is satisfied; and changing a threshold value to be used for the collision condition so that satisfaction of the collision condition becomes more difficult, in a third case in which a left side adjacent lane being a lane adjacent to left of a current lane in which the own vehicle is currently positioned is present, a same-direction condition satisfied when a travel direction of another vehicle traveling on the left side adjacent lane is the same as a travel direction of the own vehicle is satisfied, and the steering input value is equal to or more than a predetermined steering threshold value having a positive value.

9. The collision avoidance apparatus according to claim 8, wherein the object information acquisition device is further configured to acquire information on a three-dimensional object present in rear of the own vehicle as the object information, and wherein the control unit is configured to execute, when it is determined based on the object information that the collision condition is satisfied for another vehicle present in the left side adjacent lane in the third case, emergency lane keeping control of autonomously changing the steered angle of the steered wheels of the own vehicle so that the own vehicle is prevented from departing from the current lane to the left side adjacent lane.

10. The collision avoidance apparatus according to claim 8, wherein the control unit is configured to, when a curvature of a center line obtained when the center line curves to the left is defined as a positive value, and when a curvature of the center line obtained when the center line curves to the right is defined as a negative value:

calculate a curvature of the center line being a dividing line between the current lane and the left side adjacent lane in a fourth case in which the left side adjacent lane is present, the same-direction condition is not satisfied, and the steering input value is equal to or more than the steering threshold value; and calculate, when a curvature condition which is satisfied when the curvature of the center line is equal to or more than a predetermined curvature threshold value having a positive value is satisfied, a trajectory of another vehicle traveling on the left side adjacent lane in front of the own vehicle based on the curvature of the center line.

11. The collision avoidance apparatus according to claim 9, wherein the control unit is configured to, when a curvature of a center line obtained when the center line curves to the left is defined as a positive value, and when a curvature of the center line obtained when the center line curves to the right is defined as a negative value:
- calculate a curvature of the center line being a dividing line between the current lane and the left side adjacent lane in a fourth case in which the left side adjacent lane is present, the same-direction condition is not satisfied, and the steering input value is equal to or more than the steering threshold value; and
- calculate, when a curvature condition which is satisfied when the curvature of the center line is equal to or more than a predetermined curvature threshold value having a positive value is satisfied, a trajectory of another vehicle traveling on the left side adjacent lane in front of the own vehicle based on the curvature of the center line.

12. The collision avoidance apparatus according to claim 8, wherein the control unit is configured to:
- calculate the curvature of the center line being a dividing line between the current lane and the left side adjacent lane in a fourth case in which the left side adjacent lane is present, the same-direction condition is not satisfied, and the steering input value is equal to or more than the steering threshold value; and
- calculate a trajectory of another vehicle traveling on the left side adjacent lane in front of the own vehicle based on the curvature of the center line.

13. The collision avoidance apparatus according to claim 9, wherein the control unit is configured to:
- calculate the curvature of the center line being a dividing line between the current lane and the left side adjacent lane in a fourth case in which the left side adjacent lane is present, the same-direction condition is not satisfied, and the steering input value is equal to or more than the steering threshold value; and
- calculate a trajectory of another vehicle traveling on the left side adjacent lane in front of the own vehicle based on the curvature of the center line.

14. The collision avoidance apparatus according to claim 10, wherein the control unit is configured to calculate the trajectory of the another vehicle so that a curvature of the trajectory of the another vehicle matches the curvature of the center line.

* * * * *